(12) United States Patent
Neri-Badillo

(10) Patent No.: US 7,840,493 B2
(45) Date of Patent: Nov. 23, 2010

(54) PREPAYMENT SYSTEM FOR ELECTRIC POWER METERS USING A CONTACTLESS SMART CARD WITH AN AUTOMATIC SUPPLY CUT-OFF DEVICE

(75) Inventor: Eduardo Agustin Neri-Badillo, Jocotitlan (MX)

(73) Assignee: Control de Energia A La Medida Ega, S.A. de C.V., Colonia Lomas Altas (MX)

( * ) Notice: Subject to any disclaimer, the term of this patent is extended or adjusted under 35 U.S.C. 154(b) by 747 days.

(21) Appl. No.: 11/665,440

(22) PCT Filed: Sep. 30, 2005

(86) PCT No.: PCT/MX2005/000088

§ 371 (c)(1), (2), (4) Date: Apr. 12, 2007

(87) PCT Pub. No.: WO2006/041276

PCT Pub. Date: Apr. 20, 2006

(65) Prior Publication Data

US 2008/0033892 A1    Feb. 7, 2008

(30) Foreign Application Priority Data

Oct. 13, 2004 (MX) .................. PA/A/2004/010077

(51) Int. Cl.
*G06Q 99/00* (2006.01)
(52) U.S. Cl. .................. 705/63; 705/400; 705/412
(58) Field of Classification Search .................. 705/63, 705/401–412
See application file for complete search history.

(56) References Cited

U.S. PATENT DOCUMENTS

| 5,146,047 A | 9/1992 | Nagata et al. |
| 5,146,067 A | 9/1992 | Sloan et al. |
| 6,529,883 B1 * | 3/2003 | Yee et al. ....................... 705/63 |
| 7,400,264 B2 * | 7/2008 | Boaz .................... 340/870.02 |
| 2003/0225713 A1 | 12/2003 | Atkinson et al. |
| 2007/0164122 A1 * | 7/2007 | Ju .............................. 235/492 |

FOREIGN PATENT DOCUMENTS

| EP | 1052601 A2 * | 11/2000 |
| GB | 2344672 A | 6/2000 |
| WO | 2004049270 A2 | 6/2004 |

* cited by examiner

*Primary Examiner*—Jalatee Worjloh
(74) *Attorney, Agent, or Firm*—Hoffman & Baron, LLP (57) ABSTRACT

The present invention refers to the use of a meter completely integrated on a single piece, totally covered and without contact with the exterior that incorporates a prepayment system and a more efficient method to control the electric energy supply and obtains excellent information from the meter by means of contactless intelligent cards.

6 Claims, 4 Drawing Sheets

PREPAYMENT SYSTEM FOR ELECTRIC POWER METERS USING A CONTACTLESS SMART CARD WITH AN AUTOMATIC SUPPLY CUT-OFF DEVICE

CROSS-REFERENCE TO RELATED APPLICATIONS

This application is the National Stage of International Application No. PCT/MX2005/000088, filed Sep. 30, 2005, which claims the benefit of Mexican Application No. PA/a/2004/010077, filed Oct. 12, 2004, the contents of which is incorporated by reference herein.

FIELD OF THE INVENTION

The present invention refers to a prepayment system for electric energy meters, and more particularly to a more efficient system and method to control the supply of electric energy and to obtain outstanding information from the meter by means of the use of contactless intelligent cards.

BACKGROUND OF THE INVENTION

The energy utilities companies had carried out the traditional reading and elaboration of invoices to collect the supplying services after these services had been used by the consumer-client. Recently, there had been proposed state of the art prepayment systems techniques for the supply of public services for example: light, water or gas, like a form of overcoming some of the inconveniences of the traditional collection systems.

A sort of prepayment system was designed of such form that the purchase of the supply of electricity (water or gas) is done directly from a central station and the information regarding the bought amount then is communicated to the client's site where this supply is consumed. In the consumption point (local, establishment, home, etc.) of the client, a measuring device is installed and it receives the information of the prepayment communication and it also confirms the bought amount to the central station. Typically, the electricity measuring device is installed in the exterior of the business or home and a terminal that reads the prepayment information is placed along with the meter or is connected by means of a cable or by the electric supply cables to the meter, which is instead located in the inside. A disadvantage with these type of prepayment systems is that are difficult to install and expensive. Another problem with this typical prepayment system is that it doesn't provide two-way communication about the consumption information, of how the credit is used, where or which meter is using the credit, and information about tampering done to the meter.

Another sort of well-known prepayment systems is also based on the purchase of the electricity supply directly from a sales point previously determined, being the information of the supply bought amount stored in a magnetic card or in contact intelligent cards. This particular prepayment system requires the use of an electronic meter that includes a card reading device or a magnetic key and a series of additional control devices to manage the supplying of the electric energy.

Examples of the type of prepayment system above mentioned are disclosed in The U.S. Pat. No. 4,240,030 titled "Intelligent Electric Utility meter" granted to Jess R. Baterman and collaborators on Dec. 16, 1960, which describes an intelligent meter that uses an insertable magnetic card to regulate the energy supply. The U.S. Pat. No. 4,629,874 titled "Prepayment metering system" granted on Dec. 16, 1980, describes a system that uses an intelligent card and additional elements to determine the credit to regulate the supply of energy. The U.S. Pat. No. 4,731,575 "Prepayment metering system using encoded purchase cards" granted on Mar. 15, 1988 to Joseph W. Sloan, discloses a system that uses coded magnetic ribbon cards to transfer the purchase information from the collection office to the consumer. The U.S. Pat. No. 4,795,892 "Pre-paid commodity system" issued on Jan. 3, 1989, given to CIC Systems, Inc., consists of a system that uses a prepayment activated by a selling card for the supply of electricity, water, gas, etc. The U.S. Pat. No. 4,803,632 titled "Intelligent utility system" granted to Utility Systems Corp., issued on Feb. 7, 1989, describes a type of an external data processor meter that has a screen that uses reader equipment to accede and recover information, and a card payment reader device included in the LCD located inside the property. The U.S. Pat. No. 4,908,769 titled "Commodity metering systems" granted to Schlumberger Electronics (UK) Ltd., on Mar. 13, 1990, discloses a measurement system by prepayment that includes an electronic key and a slot to receive this electronic key. The U.S. Pat. No. 5,146,047 titled "Prepayment metering system using encoded purchase cards from multiple locations" granted to CIC Systems, Inc., on Sep. 8, 1992, is related with a prepayment system to supply public services using magnetic ribbon cards. The U.S. Pat. No. 5,668,538 titled "Modular electricity meter arrangement having remotely controllable switch" granted to Siemens Measurements Ltd., on Sep. 16, 1997, describes a meter disposition that includes a prepayment module that has a slot to insert intelligent cards, memory cards, etc. The U.S. Pat. No. 6,529,883 titled "Prepayment energy metering system with two-way smart card communications" granted to David M. Yee and collaborators on Mar. 4, 2003, describes a prepayment energy measurement system that uses an intelligent card to provide two way data communication to send information of the client to the supplier of the service.

However, a disadvantage with this type of prepayment meters with magnetic card reader or contact intelligent card lies on while the reader is being exposed to receive the prepayment cards, it turns vulnerable to damages (intentionally or not intentionally) by the user or due to saline atmospheres or high relative humidity. Another problem arises when the card reader is connected by a cable to the meter, since this cable is also susceptible to suffer damages. As well when the reader is incorporated to the meter, the meter has to undergo to important physical changes increasing its volume and turning it vulnerable to damages by exposing part of it to the environment, independently of turning them incompatible to the market existent connectors as the connectors S or A type.

There is still another type of prepayment systems to control the supply of electric energy, are those that incorporate ways of shutting off the supply when the credit has been finished. An example of such system is disclosed in the U.S. Pat. No. 5,959,549 titled "Communal metering system" granted to Andreas J. Synesiou and collaborators, on Sep. 28, 1999, which describes a measuring system that supplies electricity previously paid to a plurality of clients, where the supply and the energy shut off is done in a remote way. A disadvantage of this type of prepayment systems for electric energy supply control is that they require equipments for transmission and reception of information (for example, MODEM) toward and from the power station, besides of being expensive. Another problem with this system is that doesn't provide information about meter tampering.

Keeping in mind the defects of the previous technique is a purpose of the present invention to provide a prepayment system to control efficiently the supply of electric energy in electronic meters installed in the client's site.

Another object of the present invention is to provide a prepayment measurement system of energy that uses a meter tightly closed and an intelligent contactless card.

Yet more, another object of the present invention is to provide an energy prepayment measurement system that incorporates an automatic device for energy supply shut off.

Is still another object of the present invention to provide an energy prepayment system for measurement that by means of the use of contactless intelligent card could provide information to the supplier about the consumption, how the credit is being used, where or what meter is using the credit, and information about illicit and tampering done the meter.

A further object of the present invention is to provide an electric energy supply prepayment method by means of a contactless card-reader system.

SUMMARY OF THE INVENTION

The present invention refers to the use of a meter completely integrated in a single piece, totally covered and with no contact with the exterior, that incorporates a prepayment system and a more efficient method to control the supply of electric energy and to obtain excellent information from the meter by means of contactless intelligent cards.

The prepayment system of the present invention letter includes a prepayment control contactless card with energy supply shut off that also is in charge of detecting and validating a prepayment card as well as controlling the prepayment system and of supplying energy to the meter. In a preferred modality, the prepayment control contactless card with energy supply shut off includes a reader-writer element of contactless intelligent cards, a microcontroller, a zero cross detector of the AC voltage supply, a controller of the supply shut off element and a feeding source of this control card. The prepayment system of the present invention not all the time is searching for a contactless prepayment card, since it would waste too much energy for an operation that is done only few times, so the search of the prepayment card only occurs during few seconds every minute.

The electric energy prepayment method using a contactless intelligent card and an electric energy electronic meter with internal reader-writer of contactless intelligent cards, manages the steps of interchanging information between the meter and the contactless intelligent cards by radiofrequency; authenticate the intelligent prepayment card and the internal reader-writer of contactless intelligent card, in mutual form, by means of two or more digital signatures and the serial number of the meter; discharging and storing the credit of the intelligent prepayment card in the memory of the electronic meter; and storing the information generated about the state of the meter in the prepayment contactless intelligent card.

BRIEF DESCRIPTION OF THE DRAWINGS

The aspects that are considered characteristic of the present invention will be settled up in particular account in the annexed claims. Any way the invention by itself, due its organization as well as its operational method, jointly with other objects and advantages of itself, will be fully understood in the following description of certain modalities, as it is read in relation with the drawings that are attached, in which the numbers of similar references identify identical elements, where:

The FIG. 1 is a simplified diagram that illustrates the prepayment measurement system of energy in accordance with a preferred modality of the present invention.

The FIG. 2 is a functional diagram in simplified blocks of a prepayment system incorporated in an electronic meter in accordance with a preferred modality of the present invention.

The FIGS. 3 and 3A are flow diagrams useful to explain the operation of the energy prepayment measurement system of FIGS. 1 and 2.

DETAILED DESCRIPTION OF THE INVENTION

The term "CONTACTLESS CARD" as is used hereby, refers to the interchange of a command between the card and a reader-writer module without the use of galvanic elements (for example, the absence of a ohmic contact of the reader-writer module toward the integrated circuit inserted inside the card), where the power that makes function the integrated circuit inserted in the card, is taken by the command generated by the reader-writer module, the communication and power toward these integrated circuits is given by the coupling. Therefore, a contactless card could be separated from a not constant distance of some millimeters up to several centimeters from the reader writer module and there is still data transmission between them.

The term "Intelligent Card" refers to a card that its size is similar to a plastic credit card, with an integrated circuit (microprocessor, memory or dedicated circuit), with a reader that has the processing power to be used in several applications, with great security.

The term "digital signature" or "digital key" means a data sequence, by which it could deciphered a coded command with the same data sequence.

The term "tampering" as is used in the present invention refers to all the activities done to alter the consumption registration of electric energy consumed by the user of the meter.

The term "Disconnections" means the action of de-energizing the electric energy meter without cutting off the supply of electric energy to the user in such way that the meter could not register the consumption of energy of the user during the time that the meter is de-energized. The term "Inversions" means to change the mechanical position of the meter in the connection socket, with the purpose of discounting or counting less energy than what is really consumed. The term "Derivations" is used hereby to imply the bridge of minimum electric resistance placed externally to the meter, is done with the purpose of that not all the current consumed by the user passes by the meter sensors and therefore it senses less current than the real amount consumed by the user, these bridges are commonly known like "bridges".

The "Anticollision" term is an arbitrate among cards in which depending on the serial number of the cards only one is selected, this is specified in the ISO 14443-3A ISO14443-4A The present invention provides a prepayment system and method for the measurement of electric energy with contactless data communication, where the electronic meter is completely integrated in a single piece, totally covered and without any contact with the outside environment. In accordance with the preferred modality, the prepayment system and method of energy measurement reduces the installation cost providing an integral electronic meter that allows the data communication as much to the user meter as to the energy utility company, without using the existent power lines or communication transmission equipments via additional MODEMS. Also, and according to the preferred modalities of the present invention, the contactless data communication is provided through a prepayment module of a contactless intelligent—reader-writer integrated in the electronic meter, where the intelligent card transfers directly to the meter the amount bought data and also receives and stores information about the variables of the operation of the meter as well as the meter tampering that are transferred into the data base of the supplier of energy when the contactless intelligent card is recharged. The prepayment system of energy allows the payment of the supplying service before the consumption by using a contactless intelligent card. This contactless intelligent card is reloaded in a sales point terminal or directly in the power station of the energy supplier.

In the present invention, the client receives the electricity from the generating station over the power lines directly in the owner's meter and it is not necessary to connect the meter to any communication terminal or to an external equipment that could serve as link (for example, infrared connection, direct cable connection, a RF connection or communication through a AC line) to control the supply of electricity.

Figure 1:
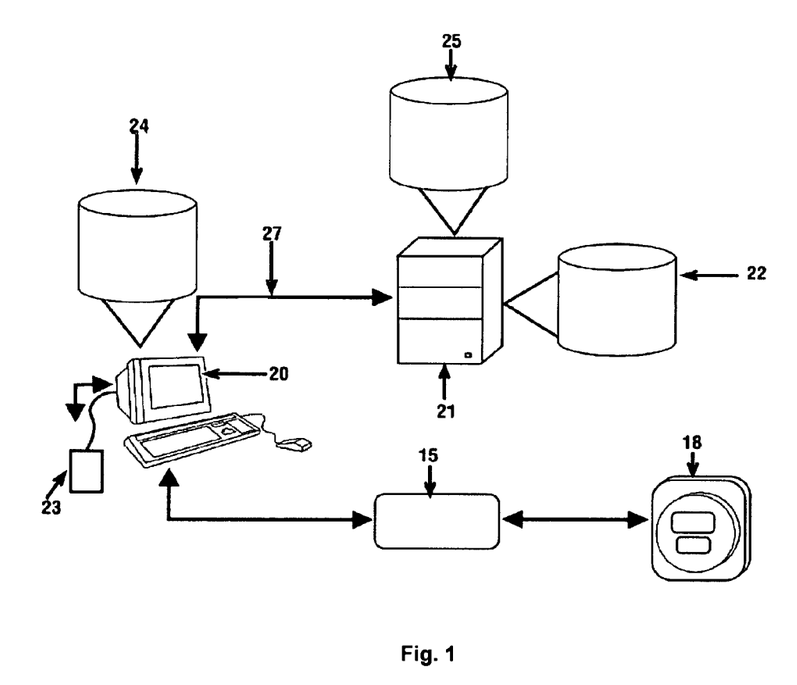

FIG. 1 illustrates a simplified diagram of a prepayment system for energy measurement in accordance to the preferred modality of the present invention. As it is shown in FIG. 1, the prepayment system for energy measurement preferably includes terminals of sales point 20 that could be located in the central station and/or in the collection offices of the supplier. The terminals of point of sale 20 are equipped with a reader-writer module of intelligent cards 23, which could be of conventional type for contactless cards or it could be one of a specific development. The terminal of point of sale 20 has a communication interface 27 to interconnect itself through server a 21 with a collect system that maintains informed about the clients' bills and of the information stored in the data base 22 of the supplier. The communication method used in the interface 27 could be, for example, through a MODEM using the Internet net or an intranet, or a dedicated link. The data base 22 also will store the quantity of prepayment kWh bought by the user, the kWh measured during the life of the meter, as well as the tampering done by the user for its analysis and to take actions in place of the energy utilities company.

To provide a secure communication as well as validating the transmission-reception of data between the terminal of point of sale 20 and the server 21, the prepayment system for energy measurement will include a pair of security modules 24 and 25 that, as is observed in FIG. 1, are to be installed as well in the server as in the points of sale. Preferably, the security modules 24 and 25 provide encryption and deencryption functions for the data transmission between server 21 the terminal of point of sale 20, for example by means of the use of digital keys in which the data will be only deencrypted through the use of such digital keys, so when data is transmitted from the terminal of point of sale toward the server and vice versa, even when the transmission of this data could be intercepted, this data would not be deciphered if the deencryption keys are not available. The transmitted data between the terminal of point of sale 20 and the prepayment intelligent card 15 are encrypted by the security module 24 by the use of digital keys written in the intelligent cards 15. The security module 24 also provides the security of the data for the transactions that are done by the contactless intelligent card 15 and writer-reader module of intelligent card 23. Preferably, the contactless intelligent card 15 and the electronic meter 18 also include the encryption/desencryption modules installed in their respective microcontroller or integrated circuit (IC) for specific use for prepayment systems to perform this interchange function of encrypted information. In a particularly preferred modality, the encryption module of the electronic meter is located in the microcontroller of a prepayment control contactless card with energy supply shut off or could be in the Reader of the contactless intelligent cards.

At the moment of hiring or renovating the electric energy supply service, the energy utilities company will install an electronic meter with the prepayment system of the present invention in the home of the user 19 and will hand over a reusable prepayment contactless intelligent card 15 previous loaded with certain amount of kWh prepaid in a point of sale 20. In a preferred modality, the prepayment contactless intelligent card 15 will be personalized with the information stored in the memory of the microcontroller, such information would be the number of meter, contract number, last date of loading the card, security keys [for example: digital signatures as well as the specified in the Mifare© encryption system (such way, that in the preferred modality, a A key is used for discharging certain amount of prepaid kWh and a B, that could load and discharge certain amount of prepaid kWh in a sector of the card], or a triple encryption system DES, etc.), amount of prepaid kWh data, amount of prepaid kWh, to be transfer to the meter by discharge. In a particularly preferred modality, the microcontroller memory of the prepayment contactless card is able to admit and store information generated by the electronic meter regarding the energy consumed by the user during the life of the meter and the meter tampering.

In order to start the supply of energy the user will place the contactless prepayment intelligent card 15 near to the contactless electronic meter reader-writer 18, this reader-writer of the electronic meter will validate the prepayment card 15 and will discharge totally or partially the amount of prepaid kWh bought. The determination of the total or partial discharge of the amount of prepaid kWh bought in card 15 to the meter 18 will depend on the value recorded in the card regarding the amount of prepaid kWh to be transfer to the meter by discharge or when the credit is minor to this discharging value. In the present invention the term "quantity of prepaid kWh to be transferred by discharge" is a predetermined amount defined by the user or by the energy utilities company, lets say that this number would be fifty, when card is placed near to the prepayment meter, the discharges will be of 50 by 50 kWh except when the amount of prepaid kWh remaining in the card would minor to 50, in this case will be discharged the entirety of the amount of prepaid kWh, from the card to the meter. Simultaneously or after discharging the amount of prepaid kWh, the contactless reader-writer of the meter will load all the information generated by the electronic meter regarding the energy consumed by the user during the life of the meter in the card and the meter tampering. The electronic meter 18 will continually display in its screen the information about the remaining amount of the supply of the prepaid electric energy so the user could go in the right time to a terminal of point of sale 20 to reload to the contactless intelligent card 15. The terminal of point of sale 20 accepts, reads and writes data toward and from a prepayment intelligent card 15 specific for the prepayment system of electricity measurement as is ordered by the program of the supplier. As it was mentioned, the card can be reloaded in a point of sale 20, but also is discharged the data gathered by the card about electronic meter to have it sent to the data base 22 so it would be revised by the energy utilities company. The terminal of point of sale 20 accepts amounts either in pesos (or any another currency type depending of the country) as well as in kilowatts/hour and it communicates back this transaction to the server 21 of the supplier of the service for its storage in the data base 22. However, this information as it is recorded 15 in the prepayment intelligent card 15 so the user discharges the amount of prepaid kWh in the meter 18 it would be in kWh form. Therefore, the screen of the meter will display this prepayment information in kWh form.

Figure 2:
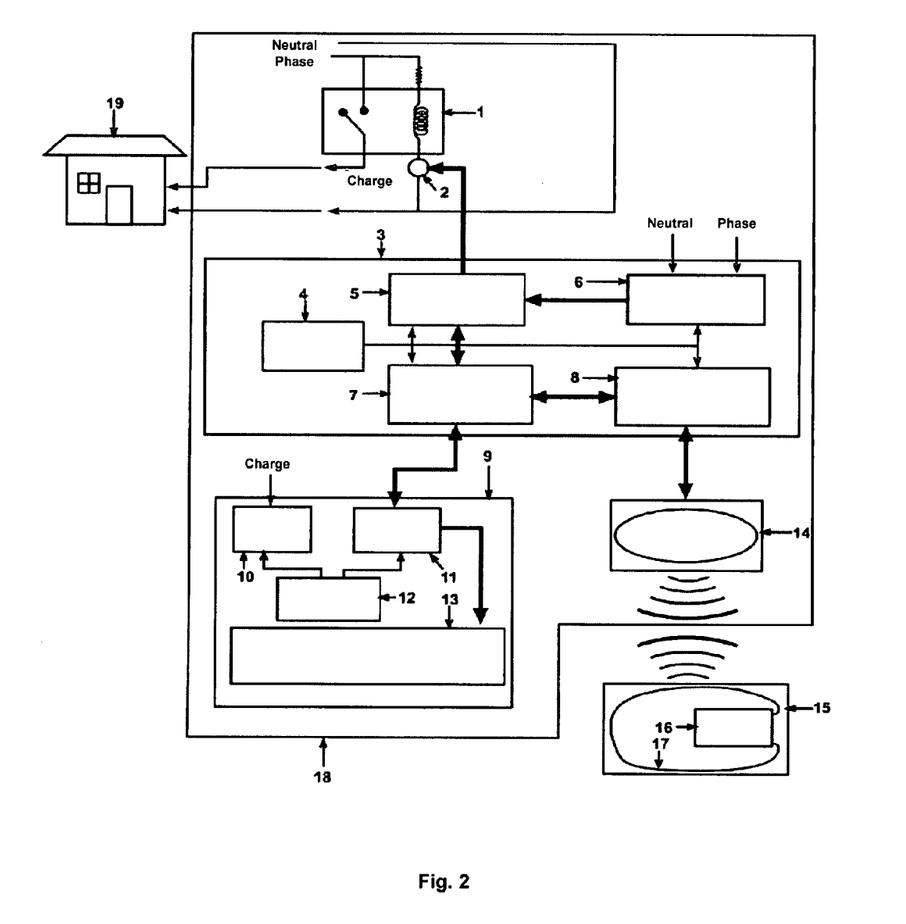

FIG. 2 illustrates a functional electronic meter diagram simplified in blocks that incorporates the contactless prepayment system to control the supply of electric energy and obtains relevant information of it, appropriate to be used in accordance with a preferred modality of the present invention. The energy electronic meter 18 with prepayment includes an electric energy measurement card 9, a prepayment control contactless card with energy supply shut off card 3, a device for shutting off energy supply 1 and an antenna 14.

The electric energy measurement card 9 includes an energy measurement module 10 that registers the electric energy consumed by the user, a microcontroller 11 that controls the operation of the energy measurement module 10 that has a flash memory to store the information of the prepaid electric energy that is discharged from the prepayment control contactless card 3, as well as the information generated in the measurement module 10 regarding the energy consumed by the user during the meter life and the meter tampering (for example, disconnections, inversions, presence of derivations, etc.) a liquid crystal display 13 controlled by a microcontroller that displays, among other variables, the information of the available energy previously paid by the user, when could it be discharged the quantity of prepaid kWh from the contactless card 15, and special information that indicates the user to place the card near the meter to start the discharge of the quantity of prepaid kWh; and a independent feeding source 12 for the measurement module 10 and the microcontroller 11 of the energy measurement card 9. The energy source works when there is supply of electric energy, it works at most for one second when there is a supply failure, time enough to back up the information of any energy transaction.

The prepayment control contactless card with energy supply shut off card 3 is the main module entrusted of detecting and validating a prepayment card 15 as well as controlling the prepayment system and the energy supply to the meter. In a preferred modality, the contactless prepayment control and energy shut off card 3 includes: a reader-writer element of contactless intelligent card 8 that also has a radiofrequency generator, a microcontroller 7, a cross zero detector of the AC voltage supply 6, a controller of the of the supply cutting off element 5 and a feeding source 4 of this control card 3. The prepayment control contactless card with energy supply shut off card 3 not always is looking for a contactless prepayment card 15, since it would waste too much, energy in an operation that is rarely done so the search of the prepayment card 15 only occurs a few seconds every minute.

The reader-writer element for contactless prepayment card system of the present invention provides, in a first way, the information of the prepayment intelligent card 15 to a microcontroller 11 of the electronic meter 18 by means of the microcontroller 7. In a second way, the reader-writer element for contactless cards 8 provides the information of the microcontroller 11 of the meter 18 toward the intelligent card 15 through this microcontroller 7. The communication of information among the contactless intelligent card 15 and the electronic meter 18 is done through a printed circuit antenna and one inserted in the contactless prepayment card (of the meter and of the prepayment cards 14 and 17, respectively, which are sensitive to the radiofrequency band in which are transmitted. Preferably, the reader-writer element of cards 8 is an integrated circuit that detects the presence of a contactless prepayment card, interprets the commands of the contactless prepayment card, and generates and sends a radiofrequency power command. This antenna 14 also captures the changing commands of radiofrequency power sent, being the radiofrequency transmission protocol the specified in the standard ISO 14443-3A, and even the specified by the standard ISO 144434A or any other radiofrequency transmission of data protocol appropriate for such objective.

The reader-writer element of contactless card 8 generates and sends a radiofrequency power command through the antenna 14 to the meter 18. The changing command for radiofrequency power perceived by the antenna 14 is caused by the presence of a contactless prepayment intelligent card 15. Upon detecting the reader-writer element of contactless card 8 the presence of a prepayment card 15, reads and transfers the prepaid amount of the contactless prepayment card 15 to the microcontroller 7 previous verification and validation of card 15 by means of a encryption a deencryption of this reader-writer of contactless cards 8. This means, the encryptation/deencryption module of the reader-writer of the contactless cards 8 verifies and validates via digital signatures the information stored in the memory of the microcontroller or IC of specific use for prepayment cards 16 of the card 15 as, for example, the meter number, contract number, last date of loading the card, security keys, data of the, amount of prepaid kWh data, quantity of prepaid kWh to be transfer to the meter by discharge, etc. If this information is not verified and validated, the reader won't discharge the amount or the prepayment information of card 15 in the electronic meter 18.

Once verified and validated the contactless prepayment card 15, the data of the prepaid amount of the electric energy supply is discharged from the contactless intelligent card 15 to the electric energy measurement card 9, through the prepayment control card 3, where the electric energy measurement card 9 is in charge of reducing the amount of energy as well as the user is consuming it. In general, the information of the amount or the quantity of prepaid kWh is stored in the flash memory of microcontroller 11 of the electric energy measurement card 9 and this microcontroller 11 is in charge of controlling the reduction of the prepaid amount of electric energy supply as the user consumes one kWh in base of the consuming information sent by this energy measuring module.

In an alternate way, the relevant information about the historical data of the meter that will be recorded in the contactless intelligent prepayment card 15 would also be stored in the microcontroller 11 Flash memory of the measurement card 9. Therefore, the interchange of information between the electronic meter 18 and the intelligent card 15 is particularly done by the microcontroller 7 of the prepayment control card 3 and the microcontroller 11 of the measurement card through a serial interface. In other words, the microcontroller 11 is the element that stores the information in its Flash memory, while microcontroller 7 detects the presence of a card 15 it reads the data stored in the Flash memory of the microcontroller 11 through a serial interface and it also reads the data of the prepayment card 15 through the reader-writer of the prepayment cards 8, and works as intermediary to transfer the information from one system to the other.

In an alternating modality of the present invention, the prepayment system for electric energy meters by contactless intelligent card includes an automatic supply of electric energy shutting off device to the user 19. In particular reference to FIG. 2, where is shown that the prepayment control card also includes a cross zero detector of electric energy 6 and a controller supply shutting off device 5 that manages a device that shuts off/reestablishes the supply of energy 1. In a preferred modality of the present invention, the microcontroller 7 of the prepayment control card 3 knows how much electric energy is left to be consumed by the user because it reads this information from the electric energy measurement card 9. Therefore, microcontroller 7 will control the supply or will shut off the electric energy to the user 19.

Typically, the electric energy shut off to the user 19 will occur when the available amount of energy stored in the electric energy measurement card 9 of meter 18, that is read by microcontroller 7, would be equal to zero. The electric energy supply will be reestablished when the available amount stored in electric energy measurement card 9 that is read by microcontroller 7, would be greater than zero. All the time, the microcontroller 7 of the prepayment card 3 will read the available amount of electric energy for the user from the energy measuring card 9.

The shut off or reestablishment of energy supply is provided by a controller device of the supply shut off and failure alarm 5, where the supply shut off/reestablishment device 1 could be, in a preferred modality, a relay. The energy supply could be shut off by the relay and failure alarm controller 5, this controller 5 has the function of opening as much as closing the relay 1 when microcontroller 7 requires it through a shut off or opening command, the controller 5 opens or closes the relay by mean of a solid state device 2. Also, the relay and failure energy alarm controller 5 also advises the microcontroller 7 if a failure of energy has occurred, this is aware of the electric energy failures by a cross zero detector 6, so it takes the necessary precautions and the information does not get lost during any failure of the electric supply. All these devices are fed by the feeding source 4.

When the microcontroller 7 reads that an available amount of energy stored in the electric energy measurement card equal to zero, this microcontroller 7 will send a shut off command to the of the relay and failure of energy control 5. The relay and failure of energy control 5 includes a microcontroller (not shown) that has three entering ports and of two exit ports. One entering port of the microcontroller serves for indicating that it should close the relay of shutting off or supplying of energy 1. Another entering port of the microcontroller serves to indicating it that it should open the shut off or supplying of energy relay 1, while the last entering port of the microcontroller indicates the cross zero AC line (it means, by the ground of the circuit or zero volts), the command that indicates the cross through zero also indicates the polarity toward it has crossed the AC supply. In other words, this last entering port indicates the moment when the phase has become positive with regard to the neutral (that is the ground of the prepayment module card 3) and vice versa (the phase has become negative with regard to the neutral). This function is given by the cross zero detector of electric energy 6 (this is a level detector circuit with an histeresis carried out with Operational Amplifiers and a voltage divisor), the zero cross is used for two purposes: one is when the microcontroller of the control of failure of energy relay 5 (not shown) detects that there is no zero crossings then is inferred that the supply of electric energy has been suspended and that will generates a lack of supply of electric energy in the prepayment control contactless card with shut off of supply of energy 3, in that moment it sends by one of its exits a command to indicate to the microcontroller 7 that must keep the convenient information for its own good operation and for not loosing the transactions data that it could being carrying out. The second purpose is the function of opening and closing the relay 1, to be closed this relay should receive a command of direct current (DC) between its activation terminals, and to be opened it must also receive a DC command but in an inverse way to the command that closes it, so to activate it upon detecting the zero crossing and polarity of the electric supply of AC, one could open the relay activating a solid state device 22 when the polarity of the phase is negative in regard to the neutral and closing it by activating the solid state device 2 when the phase is positive in regard to the neutral. On the contrary, when the microcontroller 7 reads an available amount of energy greater than zero, this microcontroller 7 will send a supplying command to the microcontroller of the relay and failure alarm control, which activates the solid state device 2 of the energy zero cross detector 6 during a positive line cycle. It should be understand that the supply shut off and energy failure alarm controller device 5 could be incorporated in a small card or like an additional function of the microcontroller 7 of the contactless prepayment and energy supply shut off card 3.

As it was previously mentioned, the intelligent card 15 will be reusable and specific for each meter; it means that it must be used in only one specific meter. The intelligent card includes a microcontroller or circuit of specific use in contactless prepayment cards 16 and an antenna 17. The personalized information of the card is recorded in the internal memory of microcontroller 16. Preferably, the intelligent card could be of the size of a conventional credit card and still being in the standard ISO 14443-1, 14443-2, 14443-3, 14443-4, although this is not obligatory. Likewise, the use of contactless prepayment intelligent cards in a prepayment system of supply of electric energy for electricity meters of the present invention has three main functions: 1) discharging the amount of prepaid kWh to be integrated to the energy electronic meter; 2) to receive the data of consumed energy during the entire life of meter, meter tampering such as disconnections, inversions and presence of derivations, without the necessity of hiring a reader or incorporating sophisticated and expensive systems; and 3) to avoid failures and mechanical wasting of the meter.

Figure 3:
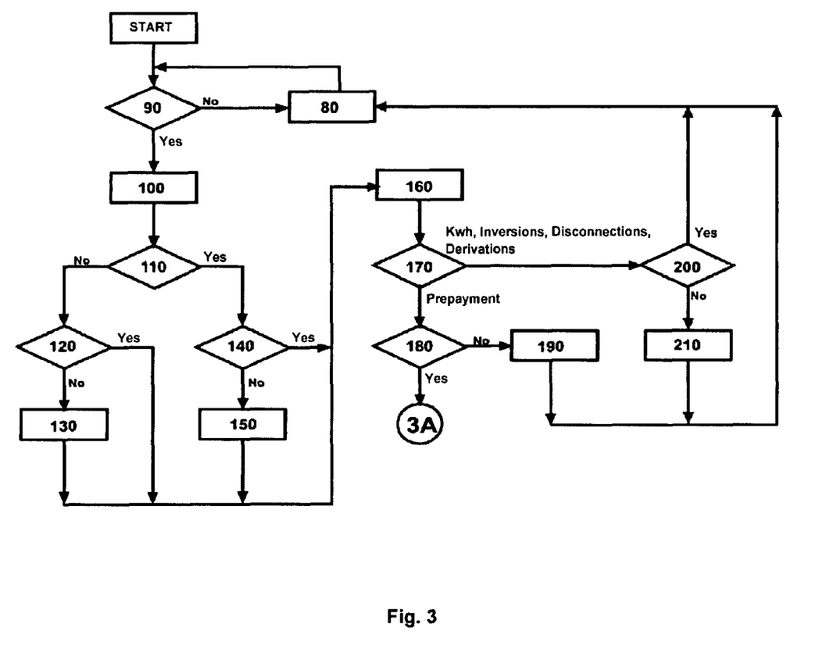
Figure 3A:
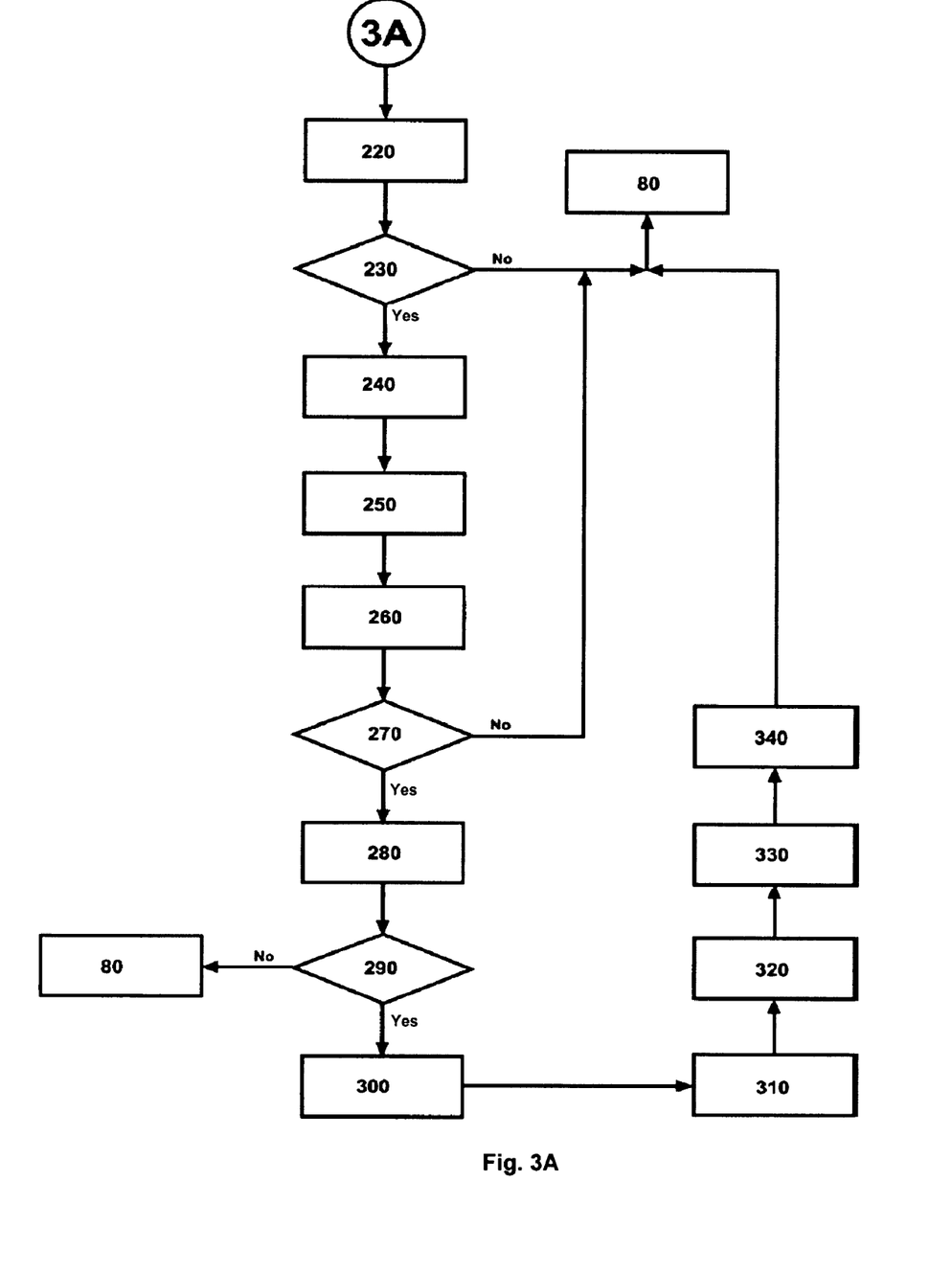

In operation, the prepayment system of electric energy by contactless intelligent cards of the present invention is loaded to the meter through the contactless prepayment control contactless card with energy supply shut off, that carries out the operations of detecting and validating a prepayment card, as well as controlling the prepayment system and supply of energy to the meter in accordance to the flow diagram of FIGS. 3 and 3A. In a particular way, the microcontroller 7 of the contactless prepayment control and energy supply shut off card 3 and it controls the prepayment system of the present invention, as well as the communications regarding the prepayment between meter 18, prepayment card 15 and energy measurement card 9, and has an independent operation from the rest of the microcontrollers of the system.

Before beginning the control and communication functions, microcontroller 7 initializes the communication serial ports with which it will communicate with the microcontroller 11 and configures the reader-writer of the contactless intelligent cards 8 so it would works in accordance with, for example, the standard ISO 14443-4A. Once initialized the ports and configured the reader-writer, the microcontroller 7 reads the data stored in the electric energy measurement card 9, such as the client serial number, stored kWh during the meter life, disconnections #, inversions #, derivations and accumulated energy during the presence of derivations (the serial number of the meter will only be read in this part of the program because this never changes). After reading the data, an internal temporizer of the microcontroller 7 is initialized so it generates an interruption each 70 milliseconds so this microcontroller 7 does a specific task. Microcontroller 7 then is set on inactive state, it means that stops doing any task and goes to "sleep" to save the maximum of energy, is of vital importance save energy to meet the standards and avoiding monetary unnecessary losses to the energy utilities company.

Microcontroller 7 could only come out from the inactive state by the interruption of the temporizer or by the interruption of the energy supply failure. Therefore, the microcontroller 7 of the prepayment control contactless card with energy supply shut off 3 is waiting for an interruption, the microcontroller will be in this condition most part of the time.

This way, if the temporizer generates a interruption command (block 90) microcontroller 7 leaves the inactive state and reads the balance of the meter, the accumulated kWh, the number of disconnections, interruptions, derivations and inversions (block 100). In an opposite case, microcontroller 7 returns to the inactive state to save the maximum of energy while is waiting for an interruption command (block 80).

Once the microcontroller 7 does the function of reading the data stored in the energy measurement card 9 (block 100), this verifies and changes the state of the relay with regard to the prepayment balance of the user. Microcontroller 7 based on the information obtained in the block 100 verifies that this prepaid balance of supply would be greater than 0 (block 110), if the credit isn't greater than zero, then it verifies if the relay 1 is opened (block 120). If the result of verifying the state of the relay 1 of the block 120 is negative, then the microcontroller 7 sends a command to the controller of the device of supply shut off and failure alarm 5 which executes the function of opening the relay 1 (block 130) to shut off the electric energy supply to meter 18. After opening the relay 1 in the block 130, the microcontroller 7 reads the information displayed in the LCD of the meter 18 (block 160). However, if the result that is determined in the block 120 is satisfactory, this means that the relay 1 is open, then the microcontroller 7 reads the information displayed in the screen of meter 18 (block 160).

Otherwise, if the balance read in the block 110 is greater than zero then the microcontroller 7 verifies if the relay 1 is closed (block 140). If the result of verifying the state of the relay 1 of the block 140 is negative, then the microcontroller 7 sends a command to the controller of the device of supply shut off and failure alarm 5 which will execute the function of closing the relay 1 (block 150) to aloud the electric energy supply to the meter 18. After closing the relay 1 in the block 150, the microcontroller 7 reads the information displayed in the screen of the meter 18 (block 160). Anyway, if the result that is determined in the block 140 is affirmative, this means that the relay 1 is closed, then the microcontroller 7 reads the information displayed in the screen of the meter 18 (block 160).

Right after the verification of the state of the relay 1 as it was described in blocks 110 to 160, the microcontroller 7 verifies through the microcontroller of the energy measurement module 10 that the screen is displayed in the meter (block 170). If the screen displayed in block 170 is the one of "prepayment", then the microcontroller 7 verifies if the radiofrequency generator is turned on (block 180) of the contactless intelligent card reader-writer element 8 and then starts the search of a prepayment card. If the determination in the block 180 is negative, a command to turn on the radio frequency (block 190) is generated and then the microcontroller 7 returns to the inactive state to save the maximum of energy while waiting for a interruption command (block 80) and restarts the routine described in blocks 90 to 180. In affirmative case in the block 180, it means that the radio frequency is turned on, and then the radiofrequency command will start to be emitted through the antenna 14 to detect the presence of a contactless intelligent card 15 that is nearby (block 220).

When the displayed screen on block 170 corresponds to the "kWh, inversions, disconnections, derivations", microcontroller 7 revises if the radio frequency emission (block 200) is turned off, in case that the radiofrequency emission would be turned off, the microcontroller 7 returns to the inactive state to save the maximum of energy while is waiting for a interruption command (block 80) and restarts the routine described in blocks 90 to 180. If the result of verifying the state of the radiofrequency emission is negative, this means that the radiofrequency emission is turned on, then the microcontroller 7 turns off or deactivate the radiofrequency emission (block 210) and then the microcontroller 7 returns to the inactive state to save the maximum of energy while is waiting for a interruption command (block 80) and restarts the routine described in the blocks 90 to 180.

After microcontroller 7 have done the functions of reading the data stored in the energy measurement card 9, verifies and changes the state of the relay 1, and checks that LCD is displayed in the meter to activate/deactivate the radiofrequency emission, it will proceed to detect the presence of a contactless intelligent prepayment card 15 and will do the transaction of prepayment discharge.

As it was mentioned before, when the microcontroller confirms that the radio frequency is turned on, the microcontroller will emit a radiofrequency command through the antenna 14 executing a function of a search call for cards 15 (block 220) in accordance with the standard ISO 14443-3A. After the search call for the cards of block 220 is done, the microcontroller 7 verifies if there is an intelligent card 15 in the detection field (block 230). If an intelligent card is inside the detection field in the block 230, an anti-collision is done (block 240) to determine if there is more than one intelligent card in the detection field (in case there is more than one intelligent card 15, one will be disabled according to the ISO 14443-3A norm). If there is no intelligent card 15 inside the detection field in this block 230, the microcontroller 7 returns to the inactive state to save the maximum of energy while is waiting for a interruption command (block 80) and restarts the routine described in the blocks 90 to 180.

Once a card is detected inside the field, the system selects the card (block 250) in accordance with the data transmission protocol by radiofrequency (for example, the specified in the standard ISO 14443-3A, and even the specified by the standard ISO 14443-4A). After selecting the card in the block 250, the microcontroller 7 authenticates the card by the digital signature of discharge of the amount of prepaid kWh and with the serial number of the meter (block 260). The microcontroller then verifies if the intelligent card corresponds to the meter (block 270), if the card doesn't correspond to this meter the microcontroller 7 returns to the inactive state to save the maximum of energy while is waiting for a interruption command (block 80) and restarts the routine described in the blocks 90 to 180. However, if the card corresponds to this meter then it will read the balance of the card (block 280). At this point, the microcontroller 7 verifies if the prepayment intelligent card has credit (block 290), if the determination in the block 290 is negative the microcontroller 7 returns to the inactive state to save the maximum of energy while is waiting for a interruption command (block 80) and restarts the routine described in the blocks 90 to 180. If the result of verifying the block 290 is determined affirmative, then the microcontroller will aloud the credit discharge of the intelligent card 15 in the Flash memory of the microcontroller 11 of the energy measurement card 9 by the contactless prepayment control card (block 300). It could occur that not all the prepayment credit is discharged in a single discharge, since the credit to be discharged depends on the amount stored in the card in the variable "Quantity of prepaid kWh to be transferred by discharge". Right after discharging the credit in the block 300, the system reads the remaining credit in the meter (block 310) and adds the discharged credit from card 15 to the remaining credit in the meter (block 320). The new prepaid credit value that results in the operation done in the block 320 is sent to the Flash memory of the energy meter (block 330) by microcontroller 11. After receiving the new credit value or at the same time, the microcontroller 11 sends to the intelligent card 15 (block 340) the information generated in the measurement module 10 regarding the energy consumed by the user during the life of the meter and meter tampering (for example, such as disconnections, inversions, presence of derivations, etc.). After sending the information to the intelligent card 15, the microcontroller 7 returns to the inactive state to save the maximum of energy while is waiting for a interruption command (block 80) to restart the routine described in the blocks 90 to 180.

Although there have been illustrated and described forms of particular realization of the present invention, it will be obvious for whom have knowledge in this matter that could be done other diverse changes and modifications without being apart of the spirit and the scope of the invention. Therefore, is sought to protect in the attached claims any change and modifications that would be under the reach of the present invention.

The invention claimed is:

1. A prepayment method of electric energy using: i) a contactless prepayment smart card having microcontroller with a memory storing a credit value for an amount of prepaid electrical energy to be purchased; ii) an electronic electricity energy meter comprising reader-writer means of contactless smart cards located within the electronic electricity energy meter and a memory; and iii) a network including a terminal of sale point having a pair of security modules, a server connected by a communication interface to a collect system that maintains information about a clients' bills and of information stored in a data base of a supplier; the method comprising the steps of:
   emitting a radiofrequency signal from the electronic electricity energy meter by means of a contactless prepayment control board;
   detecting a presence of a contactless prepayment smart card inside a detection field of the electronic electricity energy meter, wherein the electronic electricity energy meter is airtight and watertight;
   interchanging information between the electronic electricity energy meter and the contactless prepayment smart card by means of radiofrequency;
   authenticating the contactless prepayment smart card and the internal reader-writer means of contactless smart cards, in mutual form, by two or more digital signatures and a serial number of the electronic electricity energy meter;
   determining if the contactless prepayment smart card has a credit value greater than zero of the amount of prepaid electrical energy;
   discharging a part or the total amount of the credit value from the contactless prepayment smart card;
   receiving and storing the part or the total amount of the credit value of prepaid electrical energy from the contactless smart prepayment card into the memory of the electronic electricity energy meter;
   reading remaining credit in the electronic electricity energy meter;
   adding the total or partial credit discharged from the contactless prepayment smart card to the remaining credit in the electronic electricity energy meter to generate a new value of prepaid credit; and
   storing the new value of the prepaid credit in the memory of the electronic electricity energy meter;
   generating information about the state of the electronic electricity energy meter; and
   recording the information generated about the state of the electronic electricity energy meter into the contactless prepayment smart card, wherein the information comprises energy consumed by the user during the life of the electronic electricity energy meter, a credit of the meter, meter tampering, and a number of disconnections, interruptions, derivations, energy accumulated during use during the derivations and the inversions.

2. The prepayment method of electric energy according to claim 1, wherein the step of detecting the presence of the contactless prepayment smart card inside the detection field of the electronic electricity energy meter further comprises the steps of:
   determining if there is more than one contactless prepayment smart card in the detection field of the electronic electricity energy meter;
   determining a radiofrequency data transmission protocol; and
   selecting the contactless prepayment smart card in accordance with a radiofrequency data transmission protocol previously determined.

3. The prepayment method of electric energy according to claim 1, wherein information transferred from the electronic electricity energy meter and recorded in the contactless prepayment smart card further comprises power factor, quality of the line, and disconnections, inversions, presence of derivations and similar actions.

4. The prepayment method of electric energy according to claim 1, wherein the internal reader-writer means of the contactless smart card of the electronic electricity energy meter is activated during a few seconds for detecting the presence of the contactless prepayment smart card inside the detection field, executing the authenticating process for the data transmission; and saving the energy consumed to an energy utilities company.

5. The prepayment method of electric energy according to claim 1, further comprising the steps of:
   reading the remaining credit in the memory of the electronic electricity energy meter to provide a prepayment credit read;
   verifying if the remaining credit is greater than 0;
   verifying a state of an automatic supply shut off device to determine if it is opened or closed; and
   generating a signal to open or close the automatic supply shut off device based on the prepayment credit read;
   wherein when the remaining credit is greater than 0 a signal is generated to close the automatic supply shut off device to allow electric energy supply to the electronic electricity energy meter, and when the credit is not greater than 0, a signal is generated to open the automatic device for supply shut off to suspend the electric energy supply to the electronic electricity energy meter.

6. The prepayment method of electric energy according to claim 1,
   wherein the information generated about the state of the electronic electricity energy meter, data related with the energy supply and electronic electricity energy meter tampering, are stored in the memory of the electronic electricity energy meter; and
   wherein the information recorded in this contactless prepayment smart card is transmitted into a data base through a point of sale for a further analysis by an energy utilities company every time that the user recharges with prepaid electrical energy.

* * * * *